United States Patent
Koester

[11] 3,758,188
[45] Sept. 11, 1973

[54] IMAGE-TRANSMITTING OPTICAL SYSTEM
[75] Inventor: Charles O. Koester, Sudbury, Mass.
[73] Assignee: American Optical Corporation, Southbridge, Mass.
[22] Filed: June 6, 1972
[21] Appl. No.: 260,239

[52] U.S. Cl............................ 350/96 B, 350/162 R
[51] Int. Cl. .............................................. G02b 5/16
[58] Field of Search ..................... 350/96 B, 162 R, 350/168

[56] References Cited
UNITED STATES PATENTS
3,191,487  6/1965  Kruythoff et al. .................. 350/168
3,471,214  10/1969  Polanyi.............................. 350/96 B

*Primary Examiner*—David H. Rubin
*Attorney*—William C. Nealon et al.

[57] ABSTRACT

Optical system for transmitting two-dimensional achromatic images from one location to another location spaced therefrom using a single sheet-like layer, or no more than a few adjacent sheet-like layers, of elongated fiber optical components and light diffraction and image-forming means in conjunction therewith.

10 Claims, 9 Drawing Figures

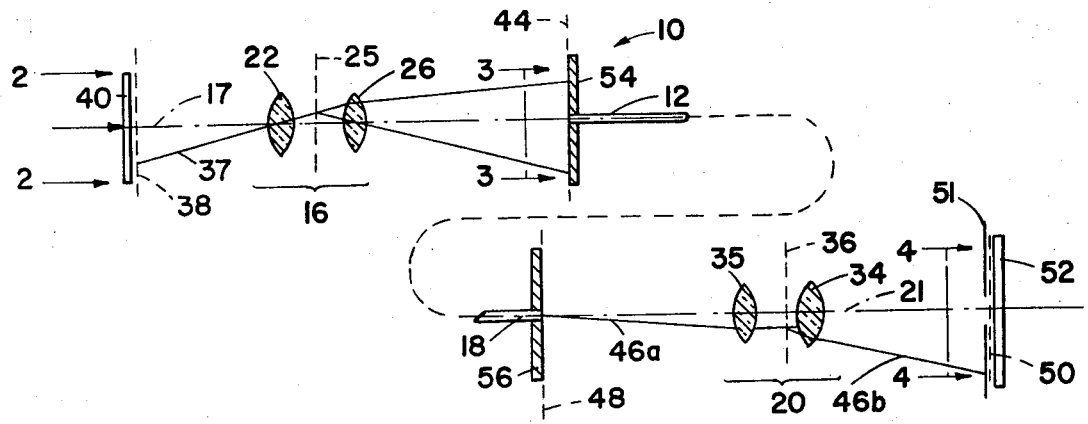
FIG. 1
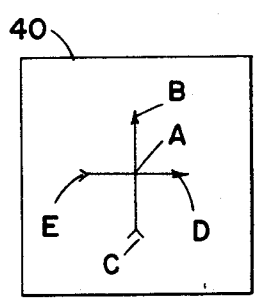 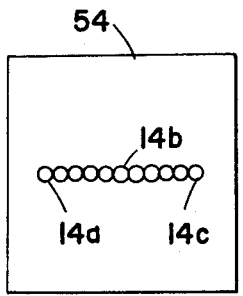 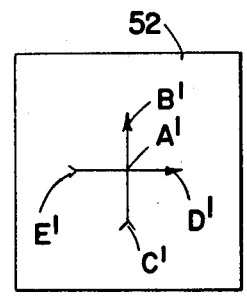
FIG. 2   FIG. 3   FIG. 4
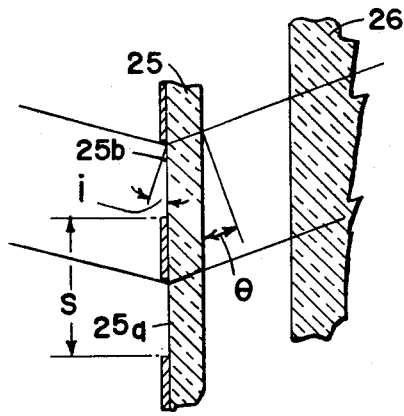
FIG. 5

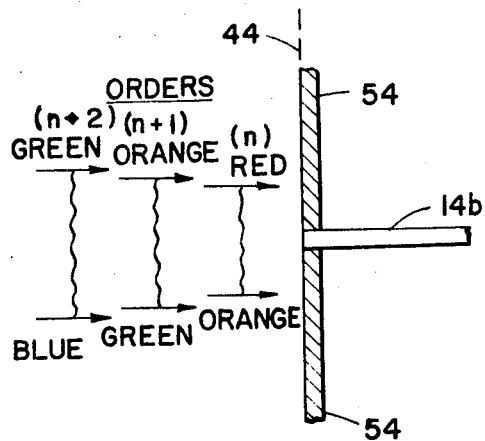
FIG. 6
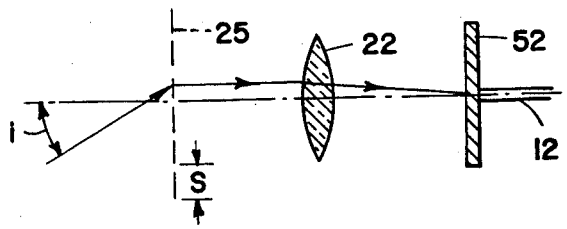
FIG. 7
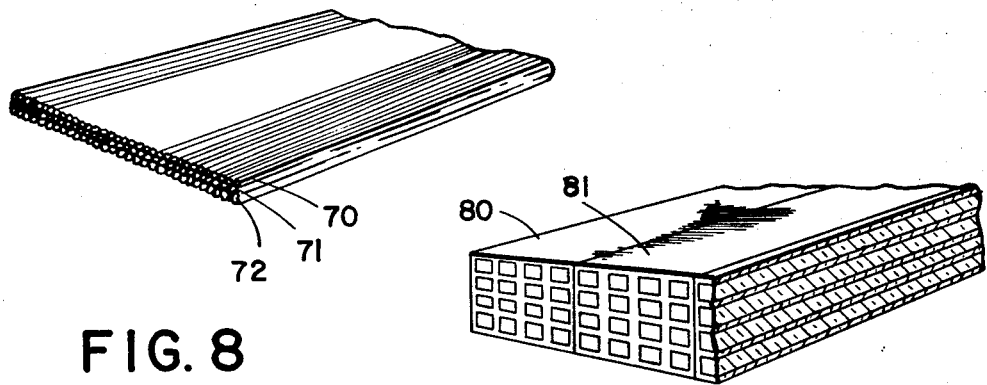
FIG. 8
FIG. 9

IMAGE-TRANSMITTING OPTICAL SYSTEM

This invention relates broadly to optical systems for transmitting two-dimensional optical images by means of a single row, or at most only a few adjacent rows, of elongated fiber optical components from a one location to another location spaced therefrom. More particuarly, the invention relates to an optical system of such improved construction and optical design as to enable two-dimensional achromatic and nearly achromatic optical images of good definition and optical quality to be transmitted by means of a single sheet-like layer, or a few adjacent sheet-like layers of elongated fiber optical components from a first location to a second location spaced therefrom.

The optical system of the present invention is of such improved construction and optical design that fewer elongated fiber optical components may be used for transportiong an achromatic optical image from a first location to a second spaced location than has been possible heretofore. Such an improved optical system employing only a single layer, or at most a few adjacent layers of components will have much less weight and cost less to produce than a conventional bundle of components for the same purpose.

The improved image-transmitting optical system of the present invention, in a preferred embodiment thereof, employs only a single elongated sheet-like layer, or assembly, of fiber optical components in like geometric arrays at their opposite ends. Adjacent the opposite ends of this sheet-like layer two generally similar light-relaying systems are employed, each including image-forming means and light diffraction means in suitably arranged relation to each other. These two light-relaying systems are of special design, as will be more fully explained hereinafter, and are disposed in proper optical alignment with and in predetermined spaced and oriented relation relative to the opposite ends of this sheet-like layer, respectively.

In a slightly modified form of the invention, a few adjacent sheet-like layers of fiber optical components may be employed arranged in like geometric array adjacent their opposite ends, in order to afford greater light flux gathering and carrying capacity for the system as well as improved resolution in the image.

It is also possible in carrying out the present invention to employ a plurality of multifiber components, instead of single fiber optical components in forming the sheet-like layer, and, when such is the case, improved image resolution and achromatization may result.

In certain instances, particularly wherein space is limited or weight is an important consideration, the transmission of two-dimensional optical images from one location to another by means of an optical system employing a single sheet-like layer of many small elongated fiber optical components, rather than a conventional image-transmitting bundle of fiber optical components, may be a material advantage. By the use of such a single layer of components, instead of a bundle, it is possible, for example, to transmit good optical images through such a single sheet-like layer of 1,000 fiber optical components, rather than through a conventional square bundle employing 1,000 fiber optical components on each side; which, of course, would be 1 million components all of which would have to be similarly arranged at their opposite ends to maintain coherence.

An optical system employing a single layer of components and capable of transmitting two-dimensional optical images from one location to another is already known and disclosed in U. S. Pat. No. 3,471,214, filed Feb. 2, 1966, issued Oct. 7, 1969, and assigned to the assignee of the instant application. However, the two-dimensional images transmitted by the optical system of U.S. Pat. No. 3,471,214 are not achromatic or object colored. They are displayed by a dispersion of spectral colors, and thus, the words of an ordinary black and white printed page would appear in such a transmitted image as dark letters against a background of different colors.

By use of the improved optical system of the present invention, it is possible to transmit two-dimensional images through such a single sheet-like layer of elongated fiber optical components which will appear in the same natural colors as those of the object with good image resolution.

The U.S. Pat. to P. N. Kruythoff et al. No. 3,191,487 describes highly complex optical systems having some similarities to the present invention. The principal embodiment of the disclosure sets forth a system for transmitting images through a single aperture light pipe or fiber bundle. It utilizes a reflective diffraction grating crossed with an echelle grating to provide a folded spectra. The image produced is highly chromatic (each image point is represented by a single wavelength) and the object field constraints as well as the necessity of unique discrete spectra lines within the aperture area severely restricts application of the invention. Since Kruythoff et al. require as many overlapping orders as the number of lines desired in the final image (normally between 100 to 1,000 lines), such coarse grating or echelle would produce far too many overlapping orders with a resulting extremely small achromatic field when used in the context of the present invention.

Kruythoff et al. recognize the desirability of achromatic imaging. It suggests achieving this by transmitting portions of spectra in the red, yellow, blue regions respectively for each object point. There is no realization or suggestion that multiple overlapping orders produced by a diffraction grating may be employed to transmit achromatized images through a coherent bundle of fibers having a transverse dimension less than the object field. The embodiments of Kruythoff et al. directed to achromatization disclose the use of multiple fiber bundles and interference filters in conjunction with prism dispersion assemblies.

It is, accordingly, a principal object of the present invention to provide an optical system for use in transmitting from a first location to a second location spaced therefrom two-dimensional achromatic or object colored optical images.

SUMMARY OF THE INVENTION

The applicant's invention contemplates an optical system for transmitting a two-dimensional achromatic image to a remotely located plane. The optical system comprises two light-relaying systems having an optical fiber assembly disposed between them and aligned therewith. The fiber assembly is composed of a relatively large number of coherently arrayed fibers having a transverse dimension substantially less than the transverse dimension of the object field. The first light-relaying system contains lens means positioned to focus upon the object field and having a conjugate focus substantially in the plane of the assembly entrance. It further contains a diffraction means producing a plurality of orders with overlapping wavelengths. The optical fiber assembly is aligned with respect to the overlapping wavelengths to transmit at least three unique discrete wavelengths for each point of the optical image. The second light-relaying system is positioned to focus upon the exit end of the fiber assembly and similarly incorporates a diffraction means for producing from each transmitted wavelength a plurality of respective orders thereby forming a substantially achromatic image in the desired focal plane.

It should be appreciated, of course, that the single layer of like light-conducting components forming such an image-transmitting assemboy as mentioned above, may be of any reasonable length desired. Also, it should be appreciated that the cross-sectional size of the individual components of such a layer (which are usually fashioned by an elongated core of transparent glass or plastic of a predetermined refractive index surrounded by a thin cladding of transparent glass or plastic of a lower predetermined refractive index) may be as desired (within relatively wide known limits). The size must, of course, be in keeping with the particular use to which the image-transmitting optical assembly is to be put and the relative size of the smallest detail to be transmitted.

Other objects and advantages of the invention will become apparent from the detailed description which follows when taken in conjunction with the accompanying drawings in which:

FIG. 1 is a diagrammatic showing of an optical system embodying the present invention;

FIG. 2 is an enlarged cross-sectional view taken substantially upon section line 2—2 of FIG. 1 and looking in the direction of the arrows;

FIG. 3 is an enlarged cross-sectional view taken substantially upon section line 3—3 of FIG. 1 and looking in the direction of the arrows;

FIG. 4 is an enlarged cross-sectional view taken substantially upon section line 4—4 of FIG. 1 and looking in the direction of the arrows;

FIG. 5 is an enlarged fragmentary sectional view of a part of a diffraction grating and lens combination which may be used in the optical system of FIG. 1;

FIG. 6 is a schematic view for use in explaining principles of the invention;

FIG. 7 is a schematic representation showing a portion of an optical system; and FIGS. 8 and 9 are cross-sectional views of modified structures which may be used in the optical system of FIG. 1.

Referring to the drawings in detail and in particular to FIG. 1, it will be seen that an improved optical system for transmitting two-dimensional achromatic or nearly achromatic optical images from a first location to a second location spaced therefrom is diagrammatically shown at 10. This optical system comprises a fiber optical assembly 12 and a pair of light-relaying systems 16 and 20 arranged in cooperation relation thereto.

The optical assembly 12, which may be of whatever predetermined length is desired, is disposed in said system so as to have its forward or entrance end 14 in optical alignment with said first light-relaying system 16 and its exit end 18 in optical alignment with said second generally similar light-relaying system 20.

The fiber optical assembly 12, which will be more fully described hereinafter, has its opposite ends optically aligned with both light-relaying systems and properly spaced from and oriented relative to the light-relaying systems 16 and 20 respectively.

The first light-relaying system 16 comprises in optical alignment along axis 17, lens 22, diffraction grating 25 and lens 26. Diffraction grating 25 provides multiple ordered light dispersion in the plane of the light incident on the grating.

In a like but reversed manner, the second light-relaying system 20 comprises progressively along the optical axis 21 lens 35, diffraction grating 36 and lens 34. Grating 36 provides light dispersion in the plane of the diagram.

Lenses 22 and 26, as indicated by light rays 37, are positioned to focus the rays from an object plane 38, at an image plane 44. The object 40, can be, for example, a photographic transparency. Image plane 44 contains and is co-planar with the entrance end 14 of the fiber optical assembly 12. Object plane 38 may be illuminated by white light as indicated by light rays 2.

In like manner, as indicated by light rays 46, the lenses 34 and 35 of relay system 20 are positioned so as to focus rays from an object plane 48 co-planar with the exit end 18 of fiber optical assembly 12 to an image plane 50. A viewing screen 52, or the like, may be disposed at this image plane to receive the light rays from assembly 12 and display the transmitted image formed thereby.

Opaque plates 54 and 56 are shown for supporting the opposite ends of the fiber optical assembly 12 in properly aligned relation to optical relay systems 16 and 20 respectively and in properly oriented relation substantially at right angles relative to the plane of incident light on the gratings 25 and 36 respectively.

Fiber optical assembly 12 may comprise a relatively large number, or multiplicity of similar thin, elongated light-conducting fiber optical components of conventional kind. They are arranged side-by-side generally parallel to one another at least adjacent their respective opposite ends in such a way as to form a single elongated sheet-like layer. Such individual light-conducting components are generally formed by a thin, long transparent core of glass (or plastic) having a predetermined refractive index surrounded throughout its length by a thin transparent cladding of glass (or plastic) of a lower predetermined refractive index to provide internal reflection.

FIG. 2 is an enlarged sectional view taken substantially upon section line 2-2 of FIG. 1 and is intended to show a photographic transparency, or the like 40, having a two-dimensional picture to be transmitted through optical system 10 in full color. This picture is, for illustrative purposes, in the form of a pair of crossed arrows marked BAC and DAE, respectively, and each may be considered to be of a different color and both differing in color from their surrounding.

FIG. 4 is an enlarged sectional view taken substantially upon section line 4—4 of FIG. 1 and is intended to show the two-dimensional image of object 40 which has been transmitted through optical system 12 to image plane 50, same being an achromatic, or full color, image when displayed upon viewing screen 52.

FIG. 3 shows, somewhat enlarged, the opaque plate 54 for supporting the entrance end 14 of the single sheet-like layer 12 of many fiber optical components, but, in order to simplify the disclosure, the number of fiber components has been greatly reduced and the diameter of each component has been materially enlarged. In this FIGURE, the left-hand component is indicated at 14a, the central component is indicated at 14b and the right-hand component is indicated at 14c. In practice, however, the number of components employed per inch would be very large and the diameters thereof would be correspondingly small; same, of course, being in accordance with the resolution desired in the transmitted image.

As herebefore indicated, the light-dispersing means is a diffraction grating used in transmission. Alternatively, it may be a diffraction grating used in reflection. A third possibility is the combination of a transmission diffraction grating and a prism which are properly aligned and oriented relative to each other. In the latter case, the members of each dispersing means are positioned so as to have the dispersion produced by the prism and that by the grating lie in substantially the same transverse plane; namely, in the plane of incidence of the prism and further to allow for an optically in-line array.

As shown in FIG. 5, the diffraction grating 25 is disposed with its parallel slits or grooves substantially perpendicular to the plane of the drawing and light diffracted therefrom is in a direction substantially parallel to the plane of the drawing. It is assumed that diffraction grating 25 is provided with an appropriate predetermined grating spacing, indicated by distance S between adjacent parallel slits or grooves 25a and 25b ruled or otherwise formed in the plate 25. It is possible to transmit achromatic or nearly achromatic optical images (for discussion purposes, true object color is considered synonymous with an achromatic image) through optical system 10 even when only a single layer of fibers is used.

In considering the principles upon which the improved optical system of the present invention operates, it is best to commence with the image forming principles of a simpler system, in which only one diffraction order from the grating is utilized. The principle is then the same as in U. S. Pat. No. 3,471,214. From each point in the object, a particular wavelength of light will be deviated by the grating and focused by the lens to the entrance end of a fiber. For the configuration as shown in FIG. 1, longer wavelengths from the lower portion of object 38 would be deviated by grating 25 so as to be incident on the entrance end 14 of fiber 12. Thus, a given fiber receives a unique wavelength from each point along a line in the object, this line being parallel to the plane of the paper. An adjacent fiber receives wavelength from points in an adjacent line in the object.

Thus, the light rays from an object point, instead of being formed into a single spot of light at focal plane 44, are dispersed into spectra formed in accordance with the composite character of the light received from the object 38. Accordingly, only a part of the light from a point will actually enter component 14b. In a like manner, each other illuminated point in the object field 40 lying in the same plane as that of the dispersed light is similarly reproduced as spectral line images at image field 44, and each at a mean conjugate location therein corresponding to the original spot location.

As a result, these spectral line images in the same plane of dispersion will variously overlap one another and light from different points, and of different wavelengths, will enter component 14. Furthermore, since a horizontally disposed row of fiber optical components is provided by layer 12 with the entrance ends (14a-14c) of the components located at image plane 44, light from all other laterally related points in object field 40 will be similarly represented by vertically dispersed light at image plane 44 and part of this light from each laterally related location will enter the corresponding component. Thus, in short, a multiplexed image will be formed by the light from all parts of the object field at image plane 44 and a fractional part of this dispersed light from each object point will be, in turn, transmitted through the corresponding components of sheet-like layer 12.

A reversed optical behavior will occur at the exit end 18 of the sheet-like layer of fiber optical components as this multiplexed light passes on through the second relay system 20 and, accordingly, the resulting two-dimensional image at image plane 54 will be of like size and shape as suggested by arrows B'A'C' and D'A'E' in FIG. 4 and will be displayed by a combination of spectral colors.

A different result is obtained, however, when the diffraction gratings 25 and 34 have a grating spacing S such that multiple orders of diffracted light can enter the fiber 12. In this case, an achromatic or nearly achromatic image of the object can be formed at the image plane of the system. Light from the object field will be dispersed by grating 25 and several different orders of this diffracted light will be caused to overlap at the focal plane 44. Therefore, light of different orders and wavelengths will enter the entrance end 14.

This is shown schematically in FIG. 6 wherein axial fiber optical component 14b, supported by plate 54 at focal plane 44, is shown as well as the relative relationships of three different orders of diffracted light, identified $(n)$, $(n + 1)$ and $(n + 2)$, approaching the entrance end of component 14b in differently offset relation thereto. The $(n)$ order diffracted light approaching the component is suggested by the spaced orange and red arrows and the wavy line spectral wavelength region therebetween; the $(n + 1)$ order diffracted light is suggested by the spaced green and orange arrows and the wavy line wavelength region therebetween; and the $(n + 2)$ order diffracted light is suggested by the spaced blue and green arrows and wavy line wavelength region therebetween.

Energy from a selected object point of three different wavelengths, namely, red-orange, yellow and blue-green, enters component 14b. Furthermore, other illuminated object points vertically spaced (parallel to the plane of the drawing in FIG. 1), such as points B and C in FIG. 2, in a similar manner radiate light which after passing beyond the grating 25 contribute light of different wavelengths in each order to fiber optical component 14b.

When these light rays of different wavelengths and of different orders emerge from the exit end of component 14b, they will be, in a reversed sense, diffracted by second grating 36 as well as focused by the lens 34. When this happens, the $(n)$ order red-orange radiation of the first selected point is deviated the same amount as the $(n + 1)$ order yellow radiation and the $(n + 2)$ order blue-green radiation from the same point. They will all arrive at the point in the image corresponding to the object point. These same wavelengths may also appear in other orders of image diffracted light but will be materially off-axis and would be removed by field stop means 51 or the like.

Therefore, these three wavelengths coincide and, together, produce a more-or-less achromatic image of image plane 50 (see also FIG. 4) of the selected object point. In a like manner, other vertically spaced image points, such as B' and C' will be formed. Also, each fiber optical component in the sheet-like layer will be functioning in a similar manner, so that, together, a full two-dimensional image will be transmitted. If a more achromatic image is desired than that provided by three different wavelengths of different order as just described, a grating with larger spacing may be used, which will provide increased order overlapping.

The design objectives for achieving an achromatic system in accordance with applicant's invention are:
1. The number, $m$, of overlapping orders desired to obtain achromatization.
2. The angular field, $\Delta i$, desired.

With reference to FIG. 7, the design parameters under our control and which can be manipulated to achieve the above objectives are:
The grating spacing, $S$
and the angle of incidence, $i$, on the grating.

To derive the relationships between the above quantities, start with the basic grating equation $$n\gamma = p23\ S \sin i \quad (1)$$

where
$n$ = order number
$\gamma$ = wavelength

It has been assumed in eq. (1) that the angle of diffraction of the light leaving the grating 25 is zero.

Let $\gamma_1$ and $\gamma_2$ be the lower and upper wavelengths between which it is desired to achromatize the image. Specifically, at each point, in the image there are superimposed $m$ wavelengths from the spectral region between $\gamma_1$ and $\gamma_2$. The order numbers for wavelengths $\gamma_1$ and $\gamma_2$ are obtained from equation (1):

$$n_1 = (1/\gamma_1)\ S \sin i \quad (2)$$

$$n_2 = (1/\gamma_2)\ S \sin i \quad (3)$$

The number, $m$, of overlapping orders is given simply by $$m = n_1 - n_2 = [(1/\gamma_1) - (1/\gamma_2)]\ S \sin i \quad (4)$$

It should be noted that the order numbers $n_1$ and $n_2$ obtained from equations (2) and (3) need not be integers. This merely means that the specific wavelengths $\gamma_1$ and $\gamma_2$ need not be present at the image point in question. From eq. (4), the number $m$ of overlapping orders is not necessarily an integer.

The angular field, $\Delta i$, can also be derived from the basic grating equation. Within the field of view each wavelength must occur in one order only. If a given wavelength should appear at two different image points (from two orders), this would mean that two different object points could contribute light to the same image point. In this case, there would then be overlapping and confusion of images. This overlapping of orders is most likely to occur at the short wavelength end of the image, i.e., for smaller values of $i$.

Let $\gamma_a$ = the shortest wavelength to which the detector is sensitive. (Or if the spectrum of the available light is limiting, $\gamma_a$ = the shortest wavelength present in the illuminating light). A more specific definition: $\gamma_a$ is the wavelength above which it is not desirable to have two different orders in the same field of view. For the eye we may take $65_a = 450$ nm, since at this wavelength the eye sensitivity has decreased to about 3 percent of its peak sensitivity. For wavelength $\gamma_a$ the grating equations for two successive orders $n_a$ and $n_a + 1$ are $$n_a \gamma_a = S \sin i_a \quad (5)$$

$$(n_a+1) \gamma_a = S \sin(i_a + \Delta i) \quad (6)$$

The angles $i_a$ and $i_a + \Delta i$ are the limits of the field. Solving (6) for $\Delta i$:

$$i_a + \Delta i = \sin^{-1} [(n_a +1)\gamma_a/S]$$

$$\Delta i = \sin^{-1} [(n_a +1)\gamma_a/S] - i_a$$

and from eq. (5)

$$\Delta i = \sin^{-1} [(n_a+1)\gamma_a/S] - \sin^{-1}(n_a \gamma_a/S) \quad (7)$$

Equations (4) and (7) give the relationship between the design objectives $m$ and $\Delta i$ and the parameters which are under our control: $S$ and $i$. (The order number, $n_a$, is determined from eq. (5).) Equation (7) is transcendental in nature, i.e., one cannot solve directly for $S$ in terms of $\Delta i$, $n_a$ and $\gamma_a$.

Therefore, it is instructive to assume a value for $m$ and values for the grating spacing, $S$, and to solve the equations for $\Delta i$. The following table gives the calculated values for the case $m = 4.4$, $\gamma_1 = 486$ nm, $\gamma_2 = 656$ nm, $\gamma_a = 450$ nm.

Line 1: The grating spacings, $S$, are assumed values.
Line 2: $\sin i$ is calculated from eq. (4). The angle $i$ can be interpreted as the angle at which the desired number of overlapping orders will be present. At larger angles, more overlapping orders will be present.
Line 3: from line 2
Line 4: $n_a$ is obtained from eq. (5). We are calculating the order number, $n_a$, for wavelength $\gamma_a$ at an angle $i_a$. In order to satisfy the requirement for $m$ overlapping orders the angle $i_a$ must equal the angle $i$ calculated in line 3.
Line 5: $\Delta i$ is then calculated from eq. (7).

| Line 1 | 10 μm | 13.3 μm | 33.3 μm | 50 μm | 100 μm |
|---|---|---|---|---|---|
| Line 2 | 0.825 | 0.619 | 0.245 | 0.165 | .0825 |
| Line 3 $i =$ | 55.5° | 38.2° | 14.2° | 9.5° | 4.73° |
| Line 4 $n_a =$ | 18.3 | 18.3 | 18.3 | 18.3 | 18.3 |
| Line 5 $\Delta_i =$ | 4.8° | 2.4° | 0.8° | 0.5° | 0.26° |

Although the angular field sizes listed appear to favor the smallest grating spacing ($S = 10$ μm ), another important factor must be considered. That is the amount of light which will be diffracted in the desired direction. In grating technology, the method for achieving high intensity at high diffraction angles is known as blazing. Therefore, the selection of grating spacing, $S$, is tied together with the blaze angle which can be obtained with that particular grating. Generally, small blaze angles are easier to achieve, especially in transmission gratings. For larger grating spacing, e.g., $S = 50$ μm), the angles of incidence are smaller; therefore a relatively small blaze angle can be used. This factor, therefore, acts in favor of larger grating spacings for transmission gratings.

For reflection gratings the echelle principle can give essentially any blaze angle, so that the smaller grating spacings will be useful.

The small angular fields listed do not necessarily limit the object field which can be viewed. A telescope with power less than unity can be used in front of the grating. For example, a telescope of one-tenth power will increase the field obtained with the grating spacing of 33.3 μm from 0.8° to 8°. A similar telescope would be necessary at the exit end of the fiber instrument.

Although most of the foregoing discussion and disclosure have been related mainly to a single row or sheet-like layer of fiber optical components, there is no reason why several rows of components such as disclosed at 70, 71 and 72 in FIG. 8 or even a row or rows of multifiber components such as disclosed at 80 and 81 in FIG. 9 could not be used instead of assembly 12 (FIG. 1). Thus, each row would pick up several wavelengths from any given point in the object field and would transport same to the exit end thereof. Thereafter, all of these several wavelengths would be combined by the second light-relaying and lens means at the image plane of the optical system, as before, as an achromatic two-dimensional image; and, in fact, with several layers or rows of fiber optical components working the achromatization of the image can be better than that obtained with a single layer.

The present invention provides a reliable practical manner for transmitting an achromatized image through a minimum sized fiber assembly. The embodiments and description are intended to be illustrative and in no way delimiting. It is intended that all modifications obvious to those skilled in the art be included within the scope of the invention.

I claim:

1. An optical system for transmitting a two-dimensional achromatic optical image from an object field to an image field comprising:
    first and second light-relaying systems;
    an optical fiber assembly disposed between said light-relaying systems and optically aligned therewith, said assembly having a relatively large number of coherently arrayed optical fibers and a transverse dimension substantially less than the transverse dimension of said object field;
    said first light-relaying system including lens means focusing upon said object field having its conjugate focus substantially in a plane containing said assembly entrance face, and diffraction means producing a plurality of orders of overlapping wavelengths, said assembly optically aligned to transmit at least three unique said overlapping wavelengths for each point of said optical image;
    said second light-relaying system focused upon said assembly exit face having diffraction means aligned to arrange each said overlapping wavelength into said plurality of orders respectively, thereby forming a substantially achromatic optical image in said image field.

2. The optical system of claim 1 wherein said assembly is formed by an array of single fibers in side-by-side relation so as to form a substantially line shape at said entrance and exit faces.

3. The optical system of claim 2 wherein said assembly is formed by a plurality of layers of optical fibers in abutting relationship so as to form rectangular shapes at said entrance and exit faces.

4. The optical system of claim 1 wherein said assembly is formed by a plurality of multifibers disposed in side-by-side relation so as to form substantially rectangular shapes at said entrance and exit faces.

5. The optical system of claim 1 wherein said first and second light-relaying means include prisms having a selected angle of deviation so as to provide a substantially in-line optical system.

6. The optical system of claim 1 wherein said assembly transmits at least five unique overlapping wavelengths for each image point.

7. The optical system of claim 6 wherein said diffraction means are blazed diffraction gratings so as to increase the amount of light contained in the transmitted overlapping wavelengths.

8. The optical system of claim 1 wherein the diffraction means includes diffraction gratings having spacings at least approximately 8.25 microns.

9. The optical system of claim 8 including optically aligned lens means for apparently increasing the object field of the system.

10. The optical system of claim 8 wherein said lens means includes first and second lenses focused on said object field and having a conjugate focus at said entrance face, and said second light-relaying means includes a first and second lens focused on said exit face and having a conjugate focus in said image field.

* * * * *